United States Patent [19]
Rozek

[11] Patent Number: 5,327,932
[45] Date of Patent: Jul. 12, 1994

[54] VALVE RESTRAINT ENHANCEMENT

[75] Inventor: Roy J. Rozek, Plymouth, Wis.

[73] Assignee: Thomas Industries Inc., Sheboygan, Wis.

[21] Appl. No.: 47,831

[22] Filed: Apr. 19, 1993

[51] Int. Cl.⁵ .............................................. F16K 15/16
[52] U.S. Cl. .................. 137/512.15; 137/856; 417/571
[58] Field of Search ............ 137/512.15, 856; 417/569, 571

[56] References Cited

U.S. PATENT DOCUMENTS

| | | | |
|---|---|---|---|
| 771,327 | 10/1904 | Schmidt | 137/512.15 |
| 1,276,478 | 8/1918 | Bechtold | 137/856 X |
| 1,634,949 | 7/1927 | Valley | 137/512.15 |
| 1,669,889 | 5/1928 | Andrews et al. | 137/856 |
| 1,679,012 | 7/1928 | Wilson | 137/856 |
| 1,780,121 | 10/1930 | Dunning | 137/512.15 X |
| 2,151,746 | 3/1939 | Cody | 137/856 X |
| 2,302,447 | 11/1942 | King et al. | 137/856 X |
| 2,682,280 | 6/1954 | Nicklas | 137/512.15 |
| 3,741,100 | 6/1973 | Beck | 137/856 X |
| 3,939,867 | 2/1976 | Lundvik et al. | 137/856 X |
| 3,998,571 | 12/1976 | Falke | 417/569 |
| 4,524,806 | 6/1985 | Romer | 137/856 |
| 4,565,507 | 1/1986 | Reimers | 417/564 |
| 4,633,825 | 1/1987 | Flaig | 123/73 |
| 4,867,650 | 9/1989 | Ikeda et al. | 417/269 |
| 4,901,760 | 2/1990 | Nagashima | 137/856 X |
| 4,955,797 | 9/1990 | Cowen | 418/15 |
| 4,978,285 | 12/1990 | DaCosta | 417/569 |
| 5,213,125 | 5/1993 | Leu | 137/512.15 X |

FOREIGN PATENT DOCUMENTS

| | | | |
|---|---|---|---|
| 0071732 | 6/1977 | Japan | 137/856 |
| 0163375 | 12/1980 | Japan | 137/856 |
| 650642 | 9/1949 | United Kingdom | |

*Primary Examiner*—John Rivell
*Attorney, Agent, or Firm*—Hill, Steadman & Simpson

[57] ABSTRACT

A valve plate assembly is provided with a valve restraint for maintaining a valve within a recessed portion of the valve plate. The valve restraint further includes an irregular surface which contacts the surface of the valve when the assembly is in use, for example, in a compressor. The irregular surface may include through-holes at least partially through the surface which contacts the valve or may be a textured surface which contacts the valve during use. The valve plate includes a recessed portion having guides for receiving notched sections in the sidewalls of the valve and valve restraint.

14 Claims, 1 Drawing Sheet

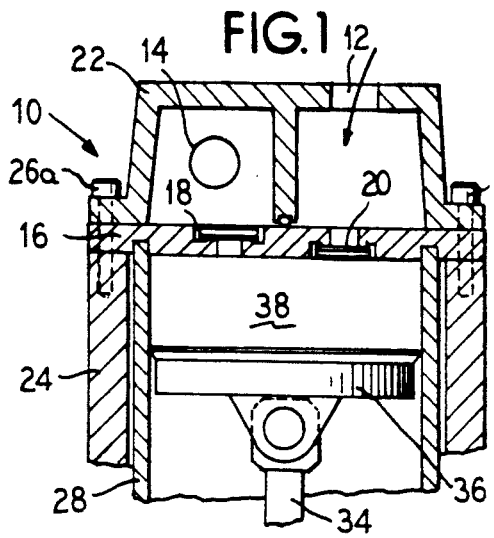
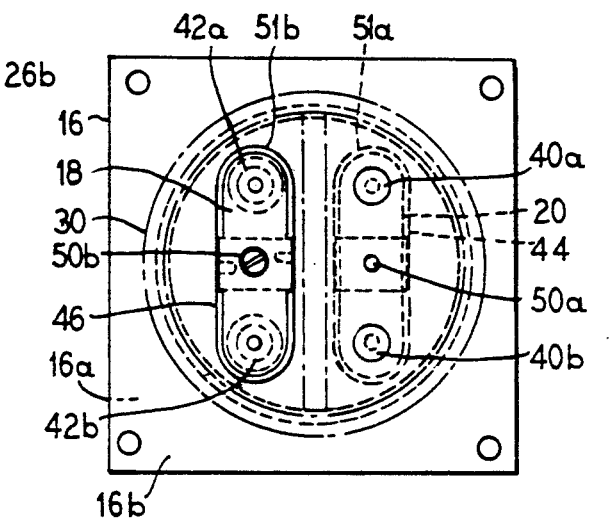
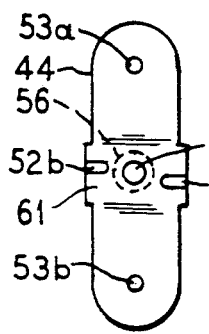
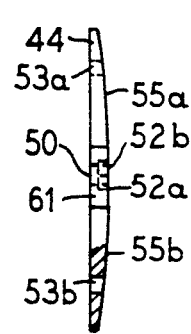
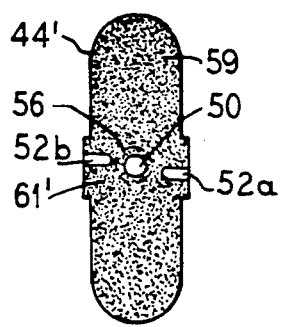
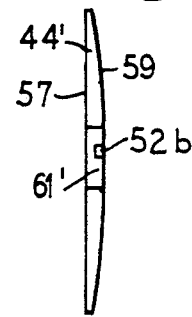
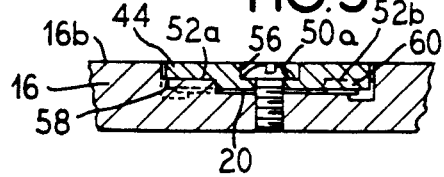
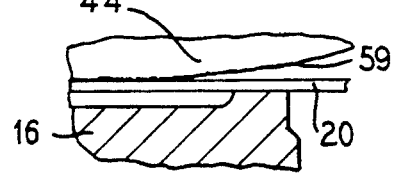
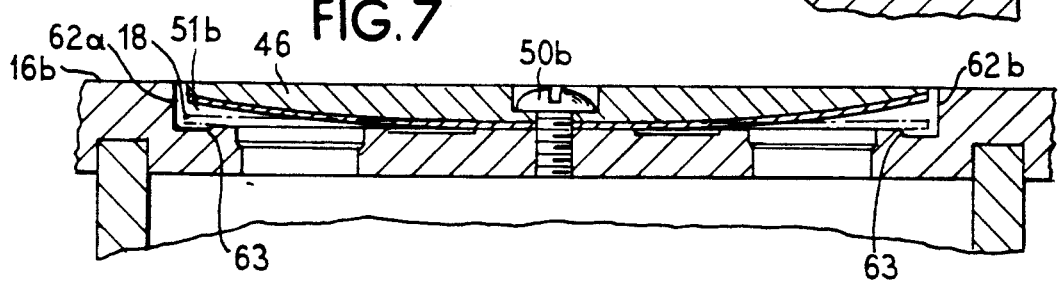

VALVE RESTRAINT ENHANCEMENT

BACKGROUND OF THE INVENTION

The present invention generally relates to a valve assembly. More specifically, the present invention relates to a flapper valve with a valve restraint on a valve plate for a piston compressor.

Typically, a valve plate is attached to a compressor cylinder block and has intake and discharge ports to the cylinder. The intake valve is mounted on the underside of the valve plate while the discharge valve is located on the top surface of the valve plate.

Reed valves are generally used to regulate intake and discharge port openings in alternative fashion where each port requires a separate valve. The reed valves are generally made of thin, resilient metal leaves and are held in place in a cantilever fashion by rivets, small screws, or by other suitable clamping means.

A reed valve assembly is known from U.S. Pat. No. 4,437,490 in which the reed valve arrangement has a base formed by two rigid members between which an intermediate portion of the reed is sandwiched. One of the rigid members has a downstream facing seat for the intake port while the other of the rigid members has a downstream facing seat for the discharge port. This arrangement allows for a single reed to be utilized wherein one free end thereof acts as an intake valve member while the other free end serves as a discharge valve member.

Material requirements for the above-mentioned arrangement are extensive since two valve plates are used with the reed member sandwiched between the two base members. The recesses of the base member must then be manufactured in complimentary fashion in order for the reed to flex freely within the recess.

Also known from commonly assigned U.S. patent application Ser. No. 07/889,254 filed May 26, 1992, now issued as U.S. Pat. No. 5,213,125 to Leu is a valve plate having a flapper valve and a valve restraint mounted in a recess of the valve plate. The valve restraint prevents the flapper valve from moving outside of the recess so that it does not come in contact with, for example, a piston in a compressor cylinder. The restraint also provides better valve efficiency and lowers the stresses on the flapper valve. The recess in the valve plate provides for an error proof assembly of the flapper valve and the restraint in the valve plate. It is thereby insured that the flapper valve has its inherently curved surface pressed against the valve plate.

Guides are provided in the recess to eliminate the need for additional fixtures to position the flapper valve and valve restraint over the port in the valve plate. Furthermore, recessed intake ports eliminate the need for a screw clearance recess in the piston top and also allow any 90° orientation of the valve plate and head.

Furthermore, the exhaust recess reduces clearance volume to offset the increase caused by the intake recess. The exhaust recess allows for the addition of sound-reducing/filtering material or baffles in the head without interfering with the valve movement and sealing. The valve plate assembly including flapper valve and valve restraint of Leu, however, has the drawback that the valve restraint typically adheres to the flapper valve when in use. As a result, the flapper valve may stick to the underside of the restraint and may not return to the sealed position.

Therefore, a need exists for an improved valve restraint for use with a valve plate having a flapper valve to overcome the deficiency of the prior art systems.

SUMMARY OF THE INVENTION

A valve restraint is provided for use in a flapper valve assembly having at least one flapper valve within a corresponding plurality of recessed portions of a valve plate wherein the recessed portions have a plurality of fixed guides. The valve restraint has a substantially smooth outer surface facing away from the recessed portion of the valve plate. Furthermore, an arcuate inner surface has an irregularity which contacts the flapper valve during use of the assembly. Notched sections along side walls of the valve restraint correspond to locations of the fixed guides in the recessed portions of the valve plate.

In an embodiment, the irregularity on the inner surface is at least one through-hole.

In another embodiment, the irregularity is formed by texturing of the inner surface.

The present invention also provides a restraint for use in a valve assembly having a valve and a valve plate wherein the upper surface of the restraint has substantially the same two-dimensional shape as the valve. The bottom surface of the valve restraint is arcuately formed and secured on the valve plate with the valve therebetween wherein the bottom surface of the valve restraint includes means for preventing adhesion to the valve.

In an embodiment, the adhesion prevention means is a textured surface.

In another embodiment, the adhesion prevention means is at least one-through hole in the bottom surface.

In yet another embodiment, the top surface is substantially smooth and is substantially planar with the valve plate.

The present invention further provides a flapper valve assembly having a valve plate with at least one recessed portion having a plurality of non-aligned guides. In addition, a resilient member substantially covers each of the at least one recessed portions and further has notched sections corresponding to the plurality of guides. A restraint having notched sections corresponding to the plurality of guides is further provided wherein a surface of the restraint at least partially contacts the member wherein at least a portion of the surface has an adhesion prevention means.

In an embodiment, the restraint is made of a molded plastic.

In another embodiment, the restraint is made of a metal.

It is, therefore, an advantage of the present invention to provide a valve restraint which eliminates adhesion between the valve restraint and the valve.

Another advantage is to provide a valve restraint having a substantially smooth outer surface which is substantially planar with the valve plate.

Yet another advantage of the present invention is to provide a valve restraint which is inexpensive to manufacture.

Moreover, an advantage of the present invention is to provide a valve restraint which is rigid to external forces applied thereto.

A still further advantage of the present invention is to provide a valve restraint which may be assembled with a valve plate and valve in a foolproof manner.

Additional features and advantages of the present invention are described in and will be apparent from the detailed description of the presently preferred embodiments and from the drawings.

BRIEF DESCRIPTION OF THE DRAWINGS

FIG. 1 illustrates a partial sectional view of a cylinder and a piston compressor showing a valve plate using the valve restraint of the present invention.

FIG. 2 illustrates a plan view of a valve plate having flapper valves and the valve restraint of the present invention assembled in recesses in the valve plate.

FIG. 3A illustrates a bottom plan view of an embodiment of the valve restraint of the present invention.

FIG. 3B illustrates a side plan view in partial cross-section of the embodiment of the valve restraint shown in FIG. 3A.

FIG. 4A illustrates a bottom plan view of another embodiment of the valve restraint of the present invention.

FIG. 4B illustrates a side plan view of the embodiment of the valve restraint shown in FIG. 4A.

FIG. 5 illustrates an enlarged sectional view of a recessed intake port which eliminates the need for a screw clearance recess.

FIG. 6 illustrates a partial section view of the valve restraint of FIGS. 4A and 4B of the present invention over the flapper valve used in the valve plate.

FIG. 7 illustrates an enlarged sectional view of the flapper valve and valve restraint of the present invention within the recessed portion of the valve plate.

DETAILED DESCRIPTION OF THE PRESENTLY PREFERRED EMBODIMENTS

A valve restraint is disclosed for use in a valve assembly of a compressor, particularly for use with a flapper valve. The valve restraint has an irregularity on at least its surface which contacts a surface of the valve. As a result, adhesion between the valve and the restraint is eliminated.

FIG. 1 generally illustrates a piston type compressor 10. The compressor 10 includes at a top portion an intake port 12 in a manifold 22 into which air or other gases to be compressed may be drawn. An outlet port 14 in the manifold 22 passes therefrom air or other gases which have been compressed by the compressor 10.

Flow of air is controlled by a valve plate assembly 16 having an outlet valve 18 and an inlet valve 20. The outlet valve 18 and the inlet valve 20 may be flapper-type valves. The manifold 22 and the valve plate 16 may be secured together onto a block 24 by appropriate fasteners, such as screws 26a and 26b illustrated in FIG. 1.

The block 24 serves as a superstructure and secures an end of a cylinder 28 tightly within the interior of a circular groove 30 (shown in phantom in FIG. 2). The circular groove 30 is formed into a lower surface 16a of the valve plate 16. The surface 16a is, therefore, on a side of the valve plate 16 facing away from the manifold 22.

As further illustrated in FIG. 1, a rod 34 and a piston 36 are shown as each functions within the compressor 10. The piston 36 may be mounted for sliding movement within the interior of the cylinder 28. The valve plate 16, the cylinder 28 and the piston 36 form a generally enclosed volume 38 in which gas or air may be compressed. Although a single piston cylinder is shown, it is, of course, contemplated that several such cylinders may be included in an air compressor device. The general operation of the piston compressor is described in U.S. Pat. No. 4,995,795, the disclosure of which is herein fully incorporated by reference.

Referring now to FIG. 2, an upper surface 16b of the valve plate 16 is shown in greater detail. Holes 40a and 40b may be formed through the valve plate 16 to provide for passage of inlet air from the manifold 22 into the cylinder 28. The inlet valve 20 and an inlet restraint 44 are shown in phantom below the holes 40a and 40b since each is positioned on the opposite side of the valve plate 16 in the illustrated embodiment of FIG. 2. Holes 42a and 42b permit passage of compressed air from the enclosed volume 38 of the compressor 10 into the manifold 22. An outlet valve restraint 46 is secured above the outlet valve 18. As illustrated, the valve 18 and the valve 20 are arranged symmetrically within the valve plate 16.

Both the inlet valve 20 and the outlet valve 18 may be secured to the valve plate 16 sandwiched between the valve plate 16 and their respective inlet restraint 44 and outlet restraint 46. The inlet valve 20 and the inlet restraint 44 may be secured together by a screw 50a through the valve plate 16.

Similarly, the outlet valve 18 may be secured to its outlet restraint 46 by a screw 50b through the valve plate 16. Recesses 51a and 51b in the valve plate 16 allow for each component—the inlet valve 20, the inlet restraint 44 and the inlet screw 50a or the outlet valve 18, the outlet restraint 46 and the outlet screw 50b—to lie at or below the surface of the valve plate 16, that is, the lower surface 16a and the upper surface 16b, respectively. The moving piston 36, therefore, may not strike the flapper valve which reduces risk of damage thereto and increases its use life time. Furthermore, a screw clearance recess is not required in the top of the piston 36.

Details of preferred embodiments of the valve restraints 44 and 46 will be further described in conjunction with FIGS. 3A, 3B, 4A and 4B. The details of the valves 18 and 20 may, however, be further referenced with the description thereof found in commonly assigned U.S. patent application Ser. No. 07/889,245, now U.S. Pat. No. 5,213,125 to Leu, the disclosure of which is herein fully incorporated by reference.

FIGS. 3A and 3B illustrate one embodiment of the valve restraint 44 of the present invention. FIGS. 4A and 4B illustrate another embodiment of the valve restraint 44' of the present invention. It should be understood that the valve restraints 44 and 46 described with reference to FIGS. 1 and 2 are substantially identical in construction and, therefore, only one of the restraints requires the following detailed description.

The restraint 44 illustrated in FIGS. 3A and 3B is made of a rigid material, generally a metal, such as a zinc alloy ZA-8. In the alternative, the restraint 44 may be made of a molded plastic or other similarly rigid material. The restraint 44 limits the extent to which the flapper valve 18 or 20 can flex when the compressor 10 is in use. Slots 52a and 52b are formed in the side walls of the restraint 44 and are offset to secure onto guides formed in the valve plate 16 and aligned with slots in the flapper valve 18 or 20, the construction and alignment of the slots has been previously described in detail in U.S. Pat. No. 5,213,125 to Leu.

The valve restraint 44 further includes holes 53a and 53b drilled completely through the exterior surfaces of the valve restraint 44. The holes 53a and 53b are near the ends of the restraint 44, but may be positioned at any point along the sloped exterior wall of the restraint 44 extending from the central mounting hole 50 to each end. In addition, the holes 53a and 53b are through-holes as illustrated; however, partially drilled holes not penetrating the restraint 44 may also be used so as to form an irregular surface of the valve restraint 44 facing the valve 18 or 20.

When the restraint 44 is in use with the flapper valve 18 or 20 in the valve plate 16, adhesion between the flapper valve 18 or 20 and the valve restraint 44 is substantially eliminated. Therefore, the contacting portions between the valve 18 or 20 and the valve restraint 44 is minimized such that the valve 44 does not stick to the restraint 44.

An alternative embodiment of the valve restraint is illustrated in FIGS. 4A and 4B. The restraint 44' in this embodiment may be a molded plastic. In a preferred embodiment, the material is a glass-reinforced polyphthalamide. However, any thermal set material may be used which may, in addition, be either reinforced or non-reinforced.

When produced, the restraint 44' includes a smooth surface 57 and an irregular, textured surface 59 which meets with the valve restraint 18 or 20. The textured surface 59 is formed on the slightly arcuate surface of the restraint 44'. The texture 59 as illustrated in FIGS. 4A and 4B is across the entirety of the surface, but, of course, only portions of the surface 59 which contact the flapper valve 18 or 20 may be textured.

The resultant valve restraints 44 or 44' with their respective arcuate surfaces limit the flexing of the flapper valves 18 or 20 after being fixed on the valve plate 16. Central mounting portions 61 and 61' of the respective valve restraints 44 and 44' are of a substantially constant thickness and increasingly narrow from the central mounting portions 61 and 61' to the respective ends of the restraints 44 and 44'. It can be seen in FIGS. 3B and 4B that the slots 52a and 52b only extend partially through the mounting portions 61 and 61' of the valve restraints 44 and 44' respectively.

As illustrated in FIG. 6, the restraint 44 has a recessed area 56 into which the head of the screw 50a may be secured. The head of the screw 50a does not extend above the upper surface 16b of the valve plate 16 or above the upper surface of the valve restraint 44. An identical configuration is provided for the flapper valve 18 such that the head of the screw 50b is below the lower surface 16a of the valve plate 16. Guides 58 and 60 are illustrated in FIG. 5 extending from the surface of the valve plate 16 into the slots 52a and 52b of the valve restraint 44.

FIG. 6 illustrates a partial sectional view of the valve restraint 44' in contact with the flapper valve 20 when secured on the valve plate 16. The irregular surface 59 of the valve restraint 44' may contact the upper surface of the flapper valve 20 during operation of the compressor 10. The surface 59 of the valve restraint 44' eliminates the problem of the flapper valve 20 sticking to the valve restraint 44' during operation.

FIG. 7 illustrates a sectional view of the outlet restraint 46 and the outlet flapper valve 18 within the recess 51b defined by recess walls 62a and 62b. The recess 51b permits mounting of the flapper valve 18 and the valve restraint 46 such that neither extend above the upper surface 16b of the valve plate 16. The recess walls 62a and 62b are spaced from the edges of the flapper valve 18 and the restraint 46 to permit air or gas to pass therebetween when the flapper valve 18 is open and near or against the surface of the restraint 46. Ordinarily, however, the flapper valve 18 is biased against a lip 63. Like FIG. 5, the screw 50b is recessed in the restraint 46 such that the head of the screw 50b is below the upper surface 16b of the valve plate 16.

A valve plate assembly 16 is, therefore, provided having a restraint 46 which restrains a flapper valve 18 from striking the piston. Furthermore, a recess on top of the piston for the valve screw is not required. In addition, the assembly may only be arranged with the flapper valve 18 in its proper orientation. Adhesion may further be prevented between the flapper valve and the valve restraint.

Since the inlet valve is recessed, a particular orientation is not required relative to clearances on the piston head such that the assembly of the valve plate 16 with respect to the cylinder 28 in any orientation is possible. Since the outlet valve is, as well, recessed, space is available in the manifold 22 for sound reducing material or baffles without interfering with valve movement.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A valve restraint for use in a flapper valve assembly having at least one flapper valve within a corresponding plurality of recessed portions of a valve plate wherein the recessed portions have a plurality of fixed guides, comprising:
    a substantially smooth outer surface facing away from the recessed portion of the valve plate;
    an arcuate inner surface having an irregularity which contacts the flapper valve during use of the assembly wherein the irregularity is formed by irregularly and randomly texturing the inner surface.

2. The valve restraint of claim 1 wherein the restraint is a rigid material.

3. The valve restraint of claim 1 wherein the restraint is a molded plastic material.

4. The valve restraint of claim 1 wherein the notched sections are equidistantly and oppositely displaced from its midpoint.

5. The valve restraint of claim 1 further comprising a recessed section on the outer surface for receiving a fastener.

6. A restraint for use in a valve assembly having a valve and a valve plate comprising:
    an upper surface having substantially the same two-dimensional shape as the valve; and
    a bottom surface arcuately formed and secured on the valve plate with the valve therebetween wherein the bottom surface further having means for preventing adhesion to the valve wherein the means for preventing adhesion is an irregular and randomly textured bottom surface.

7. The restraint of claim 6 further comprising:
    notched sections in sidewalls of the bottom surface for mating with guides in the valve plate.

8. The restraint of claim 6 further comprising:
    a recessed portion in the upper surface for receiving a fastener.

9. The restraint of claim 6 wherein the top surface is substantially smooth.

10. The restraint of claim 6 wherein the top surface is substantially planar with the valve plate.

11. A flapper valve assembly comprising:
- a valve plate having at least one recessed portion with a plurality of non-aligned guides;
- a resilient member substantially covering each of said at least one recessed portions and having notched sections corresponding to said plurality of guides; and
- a restraint having notched sections corresponding to said plurality of guides wherein a surface of said restraint at least partially contacts said member wherein at least a portion of said surface has an adhesion prevention means wherein the adhesion prevention means is an irregularly and randomly textured surface.

12. The assembly of claim 11 wherein the restraint is made of a molded plastic.

13. The assembly of claim 11 wherein the restraint is made of a metal.

14. The assembly of claim 11 wherein the restraint has a surface forming a planar surface with the valve plate.

* * * * *